Nov. 5, 1974 A. H. McELROY 3,846,208
COMBINATION PIPE FUSION UNIT
Filed May 15, 1972 5 Sheets-Sheet 3

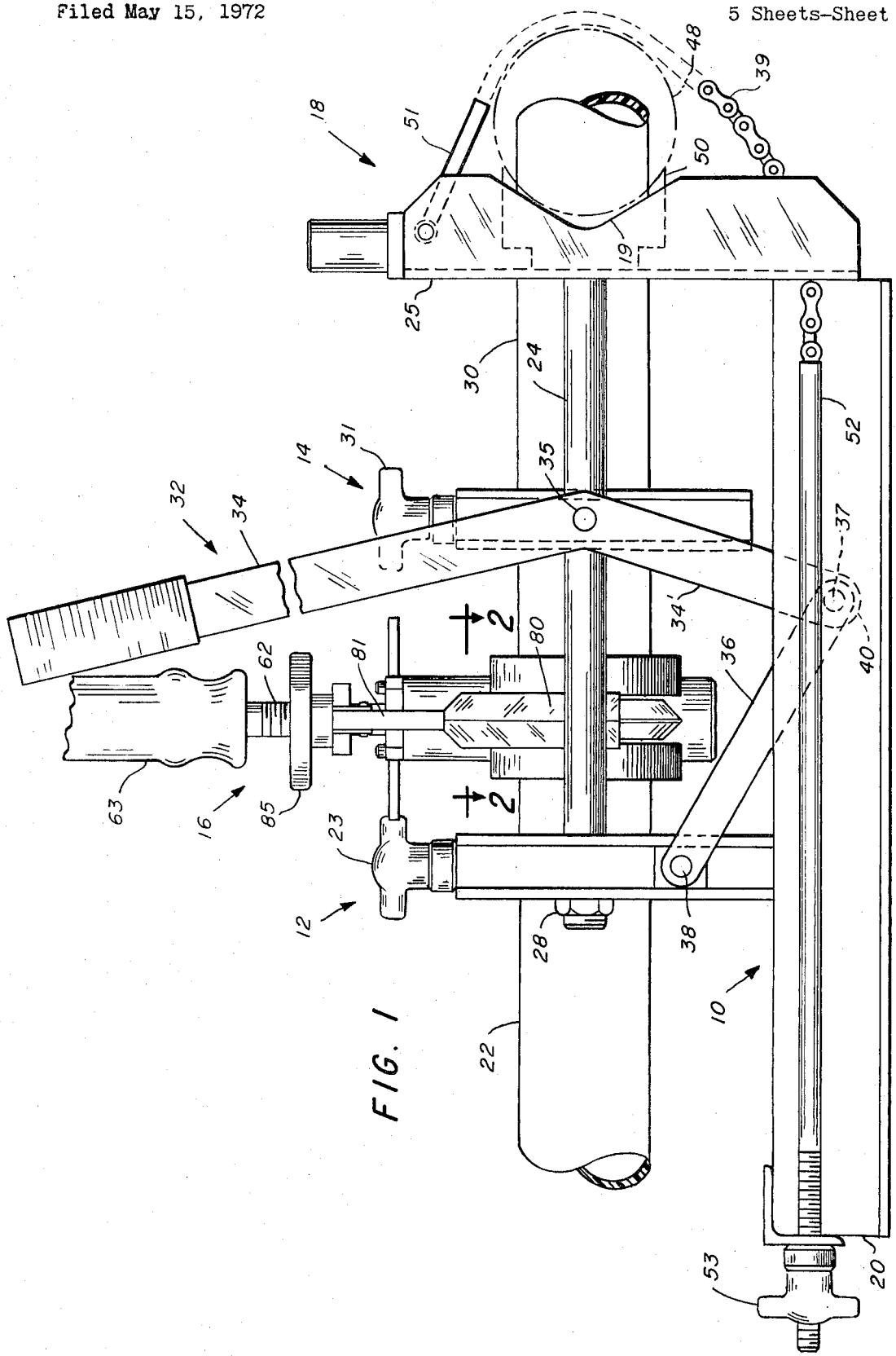

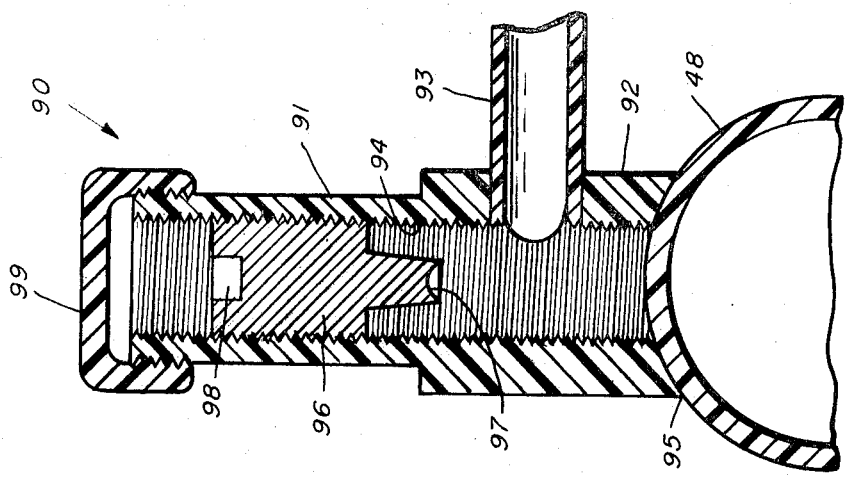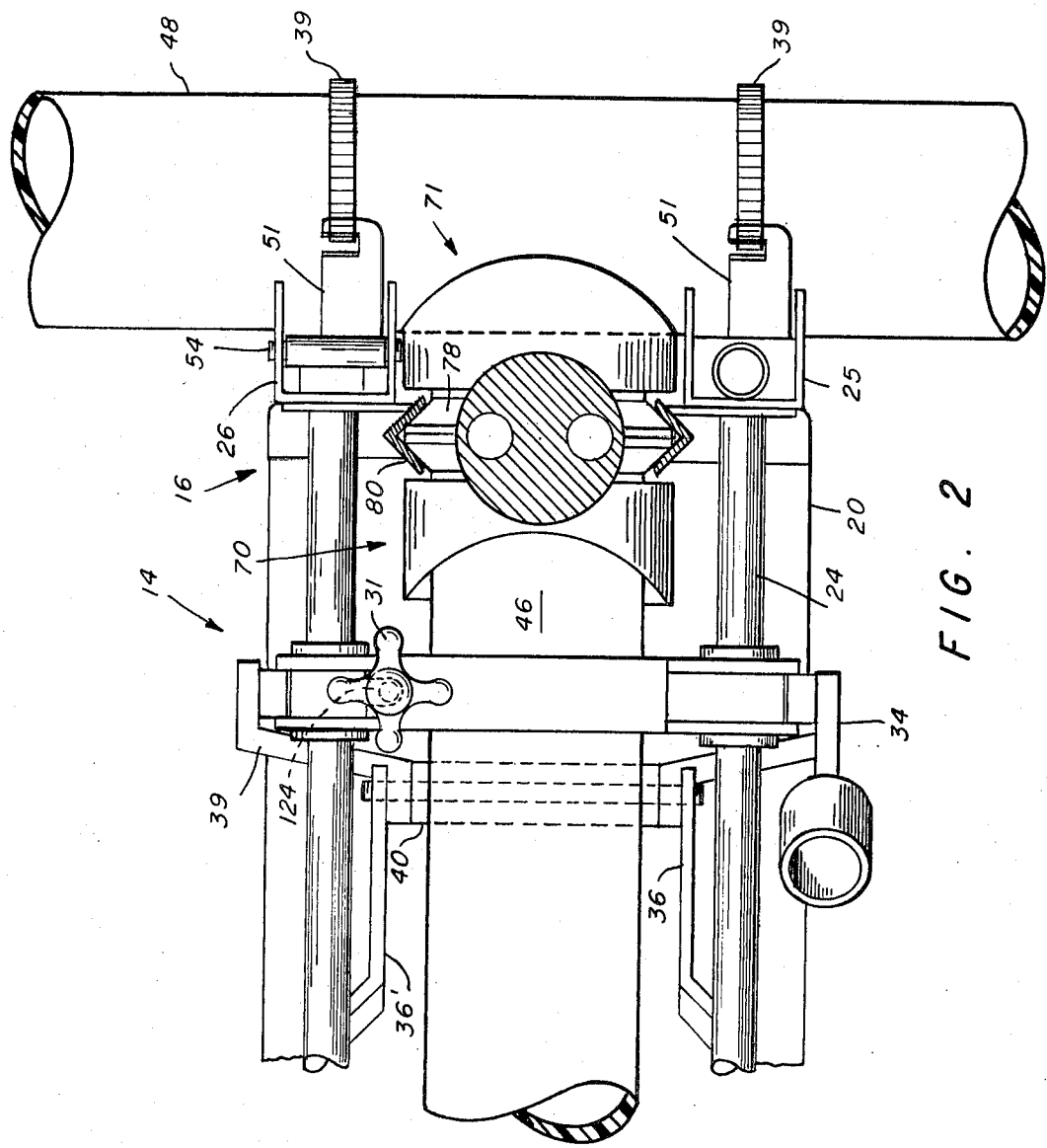

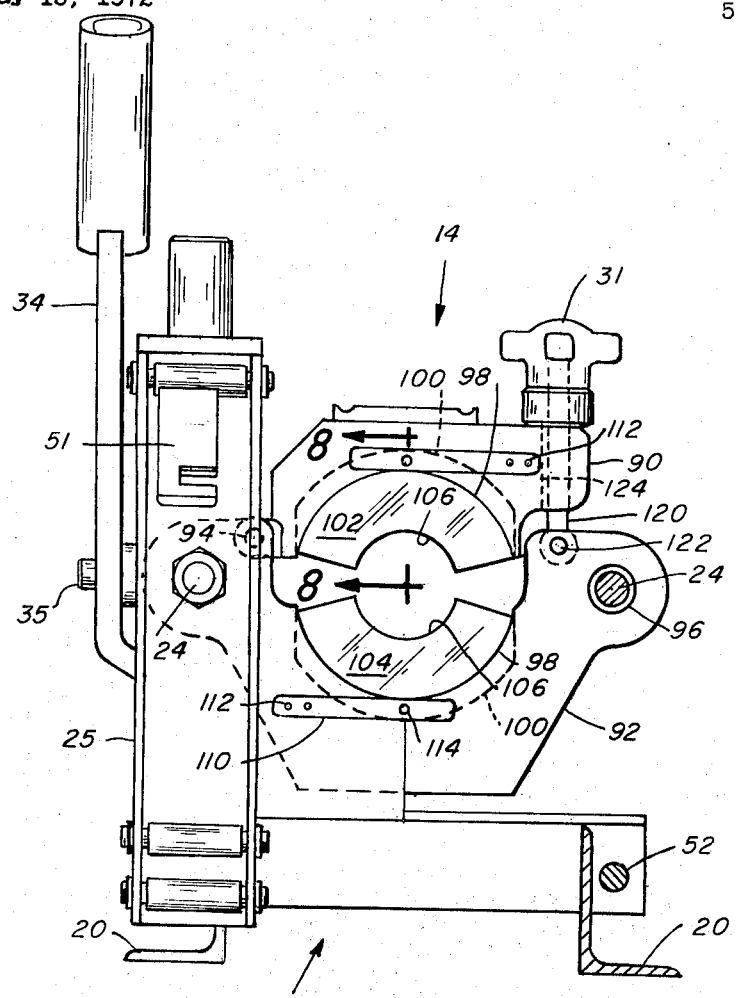
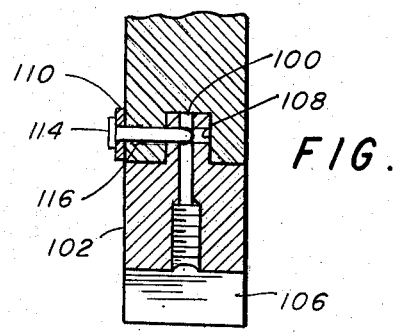

United States Patent Office 3,846,208
Patented Nov. 5, 1974

3,846,208
COMBINATION PIPE FUSION UNIT
Arthur H. McElroy, 2789 E. 45th Place,
Tulsa, Okla. 74105
Continuation-in-part of application Ser. No. 121,791, Mar. 8, 1971, now Patent No. 3,729,360. This application May 15, 1972, Ser. No. 253,179
Int. Cl. B32b 35/00
U.S. Cl. 156—499                12 Claims

ABSTRACT OF THE DISCLOSURE

This invention describes a combination pipe fusion apparatus in which heat fusible pipes can be joined coaxially (butt-joints) or at right angles (sidewall fillings). It comprises a frame having two axially aligned pipe clamps. One of the clamps is fixed to the frame and the other is axially movable toward or away from the other. There is a third pipe clamp which is fixed to the frame adapted to hold a pipe perpendicular to the longitudinal axis of the frame and to the axis of the first and second clamps. By the use of the first and second clamps one pipe can be fixed in the first clamp and another pipe can be fixed in the second clamp and be movable with respect to the first pipe to form a longitudinal in-line joint. By the use of the second and third clamps a pipe can be fixed transverse to the longitudinal axis in the third clamp and a second pipe fixed in the movable clamp and the two can be joined to form a right angle joint or connection.

CROSS REFERENCE TO RELATED APPLICATION

This application is a continuation-in-part of and an improvement upon the copending application of the same inventor Ser. No. 121,791, filed Mar. 8, 1971, now U.S. Pat. 3,729,360, entitled "Portable Thermostatic Pipe Fusion Apparatus," and is incorporated herein by reference as necessary.

BACKGROUND OF THE INVENTION

This invention is in the field of thermo-joining of pipe. More particularly, it is concerned with a combination apparatus for use with plastic pipes whereby longitudinal or transverse joints can be made with the same apparatus.

In the prior art there are a number of examples of thermal pipe-joining devices which utilize a fixed clamp means to hold one pipe and a movable clamp means to hold a second pipe. The axes are colinear and the second clamp is movable along the direction of their axes so that the two pipes can be separated or brought together where their ends are in contact. Certainly, no apparatus to the best of knowledge shows a combination of three clamps, two of which are fixed and one of which is movable so that by a minimum of apparatus, joints of both types, longitudinal and tranverse, can be made with the same apparatus.

SUMMARY OF THE INVENTION

It is a primary object of this invention to provide a simple apparatus which can be used for both longitudinal, in-line pipe joining and right-angle pipe joining of the thermal type for use with thermoplastic pipe.

This object and the limitations of the prior art are overcome in the present invention in which a frame is provided that has a longitudinal axis, which axis coincides with the in-line pipe axis. A fixed pipe clamp is provided with its axis in-line with the longitudinal axis of the frame. There is a second fixed clamp, the axis of which is transverse to the longitudinal axis of the frame. This second clamp is mounted at the second end of the frame. Between the two clamps is a third clamp which is movable and slides on horizontal support rods which are parallel to each other and to the longitudinal axis of the frame. By the use of the first fixed clamp and the third movable clamp, longitudinal thermal joints can be made in plastic pipe by the conventional processes. By using the movable third clamp and the fixed second clamp, joints can be made in which a pipe is joined at right angles to another pipe, the third movable clamp being used in both cases to relatively move one pipe with respect to the other and to press it into a pressure contact.

BRIEF DESCRIPTION OF THE DRAWINGS

These and other objects of this invention and a better understanding of the principles and details of the invention will be evident from the following description taken in conjunction with the appended drawings, in which:

FIG. 1 is a side view of the apparatus set up for longitudinal in-line pipe joining.

FIG. 2 is a top view showing the apparatus set up for a right angle pipe joint showing the pipe heater in place.

FIG. 6 illustrates an application of a right angle joint, in this case a self tapping T, attached to an existing pipeline.

FIG. 7 illustrates a view of the movable clamp.

FIG. 8 illustrates a detail of the clamp and insert taken along plane 8—8 of FIG. 7.

DESCRIPTION OF THE PREFERRED EMBODIMENT

Figure 3:
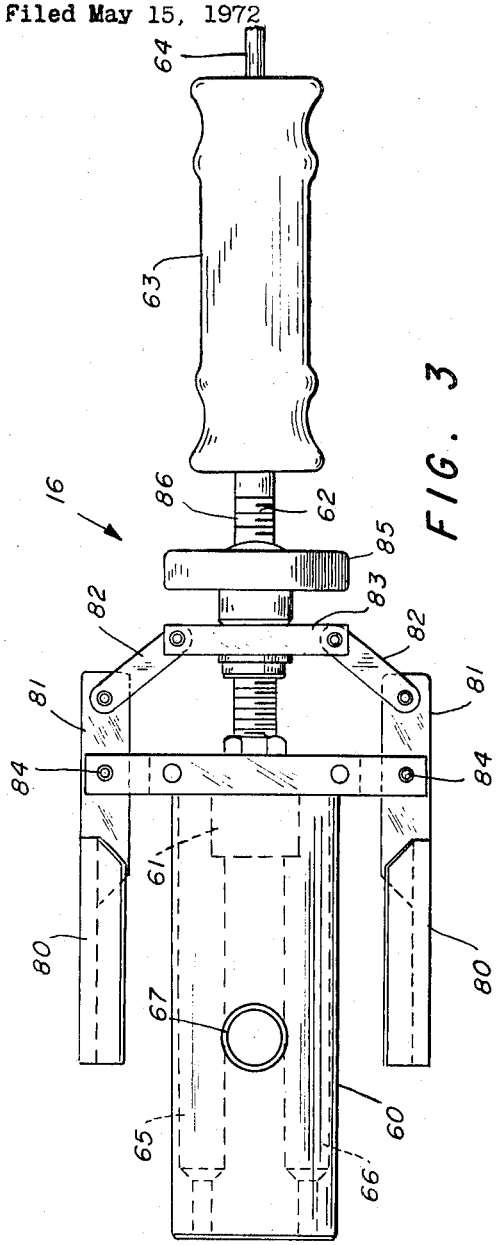
FIGS. 3, 4, and 5 show various views of the heater apparatus, particularly adapted for use in making right angle joints.

Referring now to the drawings, numeral 10 indicates generally the frame of the apparatus. Numeral 12 indicates generally the first fixed clamp, with its clamping axis in line with the longitudinal axis of the frame. Numeral 18 indicates generally the second fixed clamp, the axis of which is at right angles to the longitudinal axis of the frame. Numeral 14 indicates the third movable pipe clamp, the axis of which is colinear with the first pipe clamp. Numeral 16 indicates generally the heater unit for heating the ends of the pipe prior to pressing them into fusion contact.

The frame is indicated by the numeral 20. This is generally a rectangular frame and can be made in any desired form, so very little detail is shown or required.

The first fixed clamp 12 is mounted rigidly to the frame 20 at a position near the first end of the frame. The pipe holding axis of the first clamp 12 is generally parallel to the longitudinal axis of the frame. There is a second fixed clamp 18 mounted at the second end of the frame. This comprises a pair of upright posts which are adapted to hold semi-cylindrical or V-shaped seats, which define an axis for retaining a section of pipe transverse to the axis of said first clamp. A third clamp 14 is mounted to be longitudinally slidable on a pair of support rods 24 which are fastened to the first fixed clamp and to the second fixed clamp. The pipe holding axis of the third clamp is the same as said first clamp. A lever mechanism shown generally as numeral 32 serves to move the third movable clamp longitudinally along the frame from a position close to the first fixed clamp, near the first end of the frame, to a position close to the second fixed clamp near the second end of the frame.

No detail is shown of the first and third clamps since these can be conventional in design and would generally comprise two semi-cylindrical seats, one of which is fixed to the frame and the other of which is movable and is pressed in contact with the first cylindrical seat by means of a screw and nut. These are shown schematically in FIG. 1 as 23, for the hand wheel or nut that tightens up the first clamp and 31, the nut which tightens up the third clamp. The manner of supporting the third clamp for longitudinal traverse can be conventional and no detail is made beyond the use of guide rods 24 on which the clamp slides. The plane of the guide rods passes through the axes of the third clamp.

Any type of traverse mechanism can be used, whether manual or mechanically driven, such as by motor and screw, or by hydraulic means as described in said co-pending application Ser. No. 121,791. The apparatus illustrated in the drawings shows a lever 34 which is pivoted at point 35 attached to the third clamp 14. This lever 34 has a portion 34', which extends downward beyond the pivot point 35 to pivot 37 which joins with another link 36 which is pivoted at fixed point 38 on the first clamp. The links 36 and 34' are duplicated on the opposite side of the frame. At the pivot point 37 the levers and links are spaced apart by means of a cylindrical rod 40. By rotating the handle 34 about the pivot point 35 the third clamp 31 will move axially along the rods between the first clamp and the second clamp. By clamping a pipe 22 in the first fixed clamp, and a second pipe 30 in the third clamp, these two pipes can be faced using means well known in the art and described in said co-pending application, and heated by heater means such as shown generally as 16, which is placed between the two ends of the pipes and has in this instance heated faces in contact with the pipe ends so that when the plastic pipe is brought to the proper temperature the pipes can be separated, the heater withdrawn, and the two pipes then be brought into axial pressure contact by means of the lever 34 to provide a permanent fused joint of the two pipes.

FIG. 2 illustrates the general arrangement of the apparatus set up for right angle pipe-joining. A pipe 48 is fastened in the second fixed clamp and arranged so that its axis is perpendicular to the longitudinal axis of the frame. A second pipe 46 is clamped into the third movable clamp, so that it can be brought in contact with, or separated from, the pipe 48. The shaping of the end 46 can not easily be done in place due to the various radii of curvature of the pipes 48, so that generally the pipes 46 are purchased with the ends precut or otherwise formed to the cylindrical curvature corresponding to that of the pipe size to which it is to be joined. Such a pipe 92 is indicated in FIG. 6 which will be described hereafter.

Pipe 48 which is to have a transverse tap is held in the second fixed clamp against a seat 50 of the proper radius of the curvature by a pair of chains 39 which are linked into hinge connectors 51 and after being wrapped around the pipe surface they are attached to longitudinal rods 52 which are threaded, and by means of the hand nut 53 the pipe chain can be tightened sufficiently so that the pipe 48 is held securely in the seat 50 while the joint is being made.

Pipe 46 has its end which will be placed in contact with the pipe 48 trimmed or faced precisely to the cylindrical curvature of the wall of the pipe 48. The pipe 46 is axially movable by the third movable clamp and the operating arm 34 toward or away from pipe 48. It is withdrawn out of contact with the pipe 48 and a heater shown generally by the numeral 16 is inserted between the two. The heater will have matching face portions for respective pipes 46 and 48 (convex and concave) as described more fully in connection with FIGS. 3, 4, and 5. When the surface of the pipe 48 and the end of the pipe 46 are brought to fusion temperature the pipe 46 is moved to the left, the heater 16 is withdrawn, and the pipe 46 is then moved to the right where it is pressed into contact with the outer surface of the pipe 48.

In the preceding description it has been suggested that the clamps 12 and 14 can be of conventional design. However, there is a preferred design which is illustrated in FIGS. 7 and 8. This shows the movable clamp 14, although the same design principles can be applied to the fixed clamp 12. The two support rods 24 are shown, the one on the right in cross section. The clamp itself comprises two portions, a lower portion 92 and an upper portion 90 which is hinged to the lower portion by the pin 94. There are two bushings 96 inserted into holes bored in the lower portion, and are adapted to slide freely along the support rods 24. The clamp 14, as previously described, is moved along the support rods by means of the lever 34 pivoted around pins 35, etc.

The internal bore of the two portions of the clamp are to a diameter 98 which is larger than any of the pipes that will be used. There is a groove 100 machined to a greater depth in this internal surface. Two clamp inserts 104 and 102 are provided, the outer contours of which fit the contour 98, with an extra projecting rib 100 that fits into the groove 108 so as to securely position the clamp inserts into the two portions of the clamp. As shown in FIG. 8, two holes 116 are bored through the clamps and into the ribs 100 of each of the inserts. Pins 114 fit into these holes. The pins are fastened to leaf springs 110 which are fastened respectively to the upper and lower portions of the clamp by means of screws 112. Thus as long as the pins 114 are in position, the inserts are held securely in the clamps. By pulling out a spring, the pin is withdrawn, and the insert can be removed from the clamp. The inner diameter 106 of the clamp is machined to fit a specific size of pipe and different clamp inserts will be used for different sizes of pipe.

The clamping action of the upper portion to the lower portion is provided by means of a screw 120 which is adapted to swing or hinge about a pin 122. The nut 31 fits on the screw and by tightening the nut, the upper portion of the clamp is drawn towards the lower portion, to securely clasp a pipe which has been positioned within the contour 106. To change a pipe all that is required is to loosen the nut 31, drop the screw out of the slot 124 in the top outer edge of the upper portion 90, and lift the upper portion 90 so that a pipe can be introduced or removed, or different inserts can be placed in position, in the clamp.

This describes the general design of the frame and the two fixed and one movable pipe clamps, and their use in making joints such as butt joints of longitudinally joined pipe sections, and right angle pipe connections from a smaller pipe to a larger pipe.

While the apparatus shown is limited to nominal sizes of pipe, possibly up to four inches or more it can, of course, by following the principles here outlined, be made in any desired size. The frame shown is designed so that it can be placed on a cart for transport such as described in said co-pending application, and it can be lifted off such a cart and used in confined spaces, where pipes are already in existence and new joints must be made. For example, if a pipe line such as 48 is already in existence and is buried below the surface of the earth, and a transverse tap is required, all that is needed is to dig down to the pipe and uncover the pipe so that the frame can be placed adjacent the pipe, and a pipe tap such as shown in FIG. 6 inserted into the third clamp and the joint can be made.

In the conventional longitudinal pipe joining system the ends of the pipes are to be trimmed to be perfectly plain and perpendicular to the axis of the pipe. Thus, as shown in the copending application Ser. No. 121,791, devices are constructed which are adapted to trim the ends of both pipes at the same time and a heater is used as in FIG. 1 which has plain, parallel heating surfaces. Thus, for this type of service a single self-contained unitary heater can be provided which will work with all pipes and all sizes up to the maximum design of the heater. However, in the use of a pipe joining apparatus for the right angle joints, various sizes and types of pipes are required, and special heater adapters or heater faces are required which have a heating surface contour adapted to match precisely that of the two pipes which are to be joined.

Therefore, depending on the range of sizes that are to be used, a wide variety of heater faces are required and a heater design which permits the installation of heater faces of different surface contour is required.

The heater 16 shown in FIGS. 1, 2, 3, 4, and 5 is of such a design. It comprises a cylindrical heater portion 60 which is provided with a plurality of longitudinal drilled holes 65 and 66 into which electrical resistance heaters can be installed to heat the cylindrical metal member 60. While only two holes are shown, any number can be used. The heater faces shown generally by the numerals 70 and 71 are adapted to clamp around the cylindrical surface of the heater body 60. The heater faces are constructed of cylindrical portions 72 with one end machined out to a semi-cylindrical form of the precise diameter of the body 60. This surface is indicated as 75. The other end is machined to a semi-cylindrical shape of a radius which is preselected to conform to that of the pipe which is to be heated. As seen in the drawings, one surface 74 is concave while the other surface 77 is convex. Both are cylindrical and the axis of both surfaces 74 and 77 are parallel. There are transverse cylindrical bosses 67, and 68 on each side of the heater body 60, which fit into openings 76 in the heater faces. This positions them longitudinally on the heater body so that the axes of the two faces 70, 71 are exactly coaxial and perpendicular to the axis of the heater body. At the outside surfaces of the inside ends of each of these faces 70, 71, there are machined circular conical portions 78, by means of which the two faces are clamped together after they are positioned around the heater body 60. The means to clamp these two portions together comprises a pair of angles 80 welded to levers 81 which are hinged at points 84, so that they can be spread apart or brought together, to exert pressure on the peripheral and semi-conical grooves of the heater faces, to press them inward toward the heater so that there is good heat transmission from the heater body to each of the heater faces. The levers 81 are controlled by links 82 and arms 83 which are moved longitudinally along the rod 62 which has threads 86 and which support a hande 63. The electrical cable 64 passes through the handle through the rod 62 into a space 61 where connections can be made between the heater elements, the cable, and a thermostatic switch. The hand nut 85 is adapted to be threaded along the rod 62 and by screwing it downwardly, the arms 83 press down forcing the links outward and the levers outward and causing the angle portions 80 to be pressed inward to provide the clamping and locking action required to keep the heater faces in intimate contact with the heater body.

In general, the heater faces and the heater body will be made of good heat conductivity metal, and they will generally be made of a larger diameter stock than the pipes to be heated so that there will be sufficient heat carried to all parts of the pipe surfaces to provide the proper temperature of the pipe so that when they are finally pressed together, a solid joint will result.

The description of the heater unit 16 provides for heating elements inserted in longitudinal openings. As is well known in the art, an additional longitudinal opening can be drilled for a thermostatic switch (not shown) which can be installed in the heater body 60 so as to control the heater elements which fit into the openings 65, 66 so as to maintain the heater body 60 at a constant preselected temperature. However, a preferable system for controlling the temperature of the heater body is described in connection with FIGS. 9 and 10.

Figure 4:
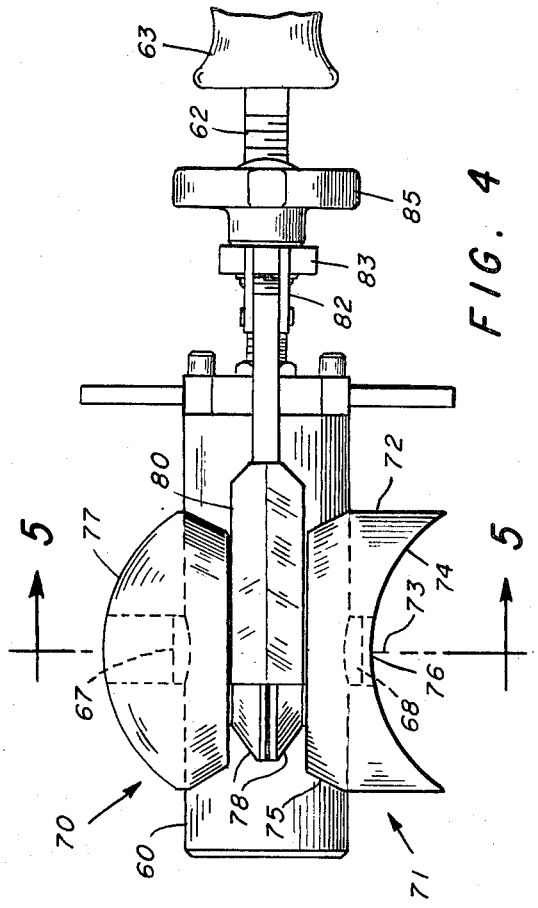
Figure 5:
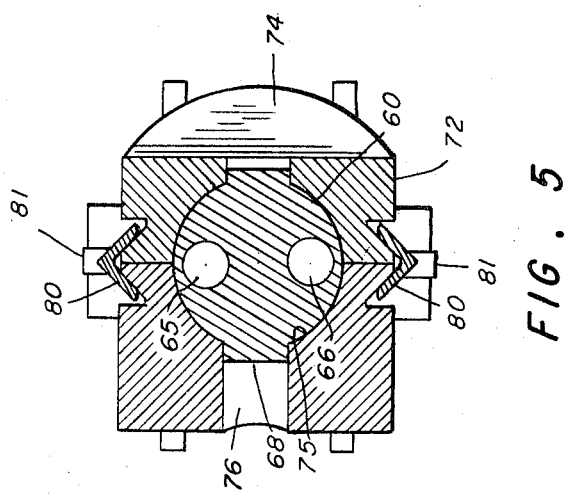

While the heater shown in FIGS. 3, 4, and 5 illustrates particularly the use of heater faces 70 and 71 adapted for right angle pipe joining, it will be clear that the faces 74 and 77 can be plane and parallel and in that case can be used in the position shown in FIG. 1 to heat the opposing faces of the two pipes to be joined longitudinally. Thus the heater shown in FIGS. 3, 4, and 5 is a universal heater for use with all types of joints and pipe sizes.

Figure 10:
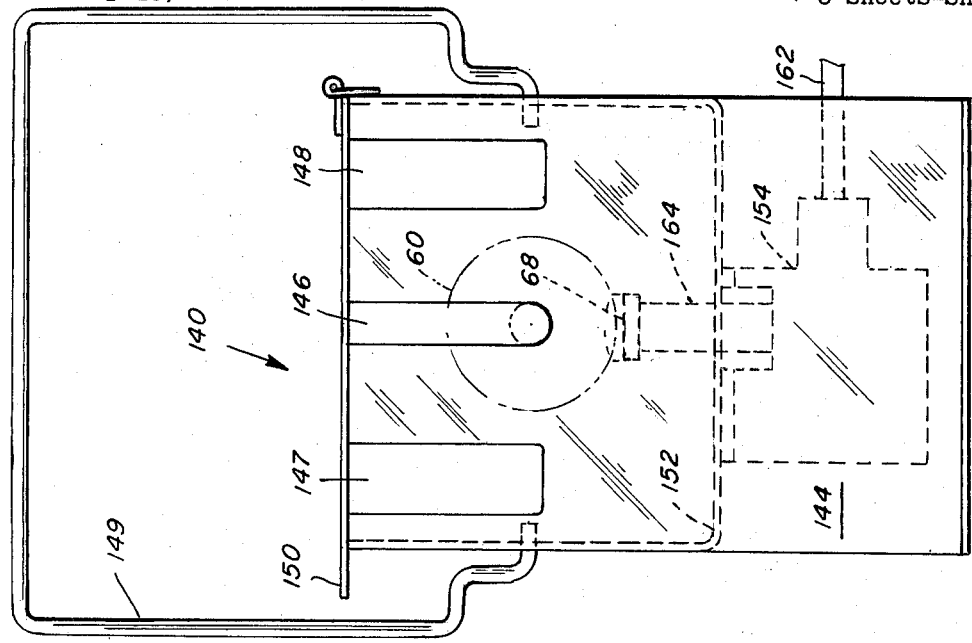
FIGS. 9 and 10 show two elevation views of a heater box.
Figure 9:
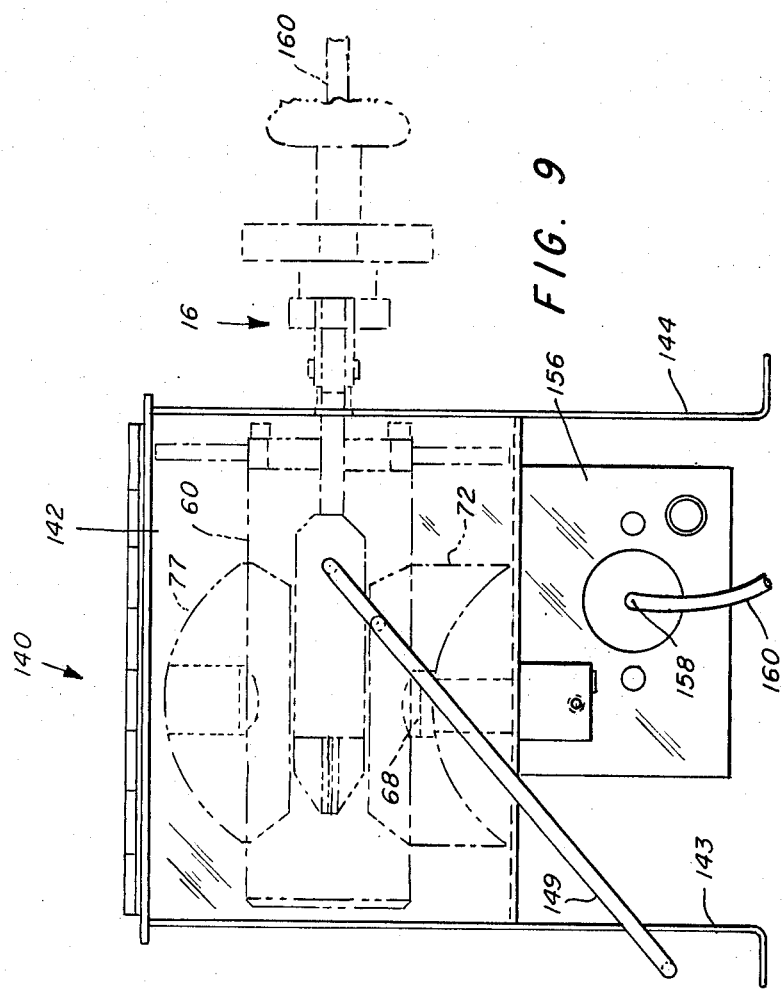

Reference is now made to FIGS. 9 and 10. These show two elevation views of a heater box in which the heater is placed in contact with a thermostatic control unit so that power is supplied to the heater on a continuing basis so as to maintain a predetermined temperature of the heater body.

This heater body 140 is a rectangular box 142 having two sides 143 and 144 extended downwardly to form legs on which the box stands with its bottom 152 at a predetermined elevation above the floor. One face of the box indicated by numeral 144 has three vertical slots cut in the upper portion. These are respectively for the three parts of the heater, the central cylindrical portion 82 and the hinged arms 81, so that when the cover plate is lifted the heater can be placed in a horizontal position such as shown in FIG. 4. The heater 16 is indicated by dashed line in FIG. 9 when in position inside the heater box.

The thermostat 164 is fastened in a fixture 154 which is hung beneath the bottom plate 152 of the box. The thermostat extends upwardly through an opening in the bottom of the box, and is of such a diameter that it fits inside of the central opening in the face 72 and makes direct thermal contact with the boss 68 of the heater. Electrical power is supplied to the heater box by means of a flexible cable 162 which comes into the box 154. One face of the box 154 carries an electrical outlet into which can be inserted a plug 158 and attached cord 160 which supplies power to the heater elements in the heater 16.

The heater box has a handle 149 by which it can be moved from place to place. It can be placed on the vehicle which carries the pipe fusion apparatus, or it can be placed on the vehicle which carries the pipe fusion apparatus, or it can be set on the ground nearby, to the extent that the cords 162 and 160 are of sufficient length. With the heater unit 16 inside the box, current will flow through the heater elements on a controlled basis to maintain the desired temperature of the heater. When the cover is opened and the heater is removed and placed in the fusion apparatus, as in FIG. 1, to heat the opposing faces of the pipes, the thermostat is now out of contact with the high temperature surface of the heater body, and becomes chilled, turning on the power and keeping full power of the heater so long as it is out of the heater box. By the use of this heater box the heater unit is always up to temperature and ready for use.

It was mentioned previously that the surface of contact between a pipe 48 and a right angle pipe 46 must be formed to the proper radius of curvature. This is shown in FIG. 6, which represents a commercial type of plastic pipe device, which is adapted to provide a right-angle tap on an existing pipeline, which is in current use, with gas or liquid under pressure. This is a commercial item such as is available on the market, and is illustrated simply for its use in a pipe joining apparatus of this invention. The right angle pipe 91 will generally have a larger diameter, thicker-walled, portion 92, which is shaped to the contour 95 of the pipe 48. The internal surface of the pipe 91 is threaded, and serves to fit a metal cutter 96 which is threaded in the same manner, so that by the use of a wrench in the socket 98, this metal cutter which has a cutting edge 97 at its bottom end can be screwed down in contact with the pipe 48 and by rotation of the cutter, a hole will be cut and the circular blank which is cut out will be pressed into, and retained in, the underside of the portion 97. The threads between the cutter and the pipe provide sufficient seal against the fluid pressure in pipe 48 for the short time that the cutting operation is under way, so that there will be no great amount of leakage. After the hole is cut into the pipe 48, the cutter is screwed back out beyond the end of the side pipe 93, and there is now a clear fluid connection between the pipe 48 and the pipe 93. The cutter which is still holding the small circular disc, that is cut out of the pipe 48, stays inside of the pipe 91 and a cover 99 is placed on and sealed to the pipe 91, so that there will be no leakage of fluid from the pipe 48 out through the pipe 91 past the threads and out the end of the pipe 91.

Of course, if the pipe is to be joined while the pipeline 48 is not in use, then the precautions of cutting the openings shown by FIG. 6 need not be followed, and an opening can be cut in the side of the pipe 48 and a conventional pipe can be cut in the side of the pipe 48 and a conventional pipe of the proper radius of curvature on its end can be sealed to the pipe 48 in accordance with the previous description.

Although the invention can be applied to pipes made of any suitable thermoplastic material, the materials to which it can be most effectively applied include linear polymers and copolymers of vinylidene chloride, polymerized methyl methacrylate, polystyrene, linear polymers of ethylene, linear copolymers of ethylene and propylene, and the like. Although the method of the invention has utility in butt-welding pipe joints of thermoplastic materials in general, it is particularly applicable for butt-welding pipe joints made from polymers of ethylene or other olefins.

While the drawings illustrate the manual apparatus for traversing the third clamp, said co-pending application illustrates and describes hydraulic apparatus for performing said operations. Such descriptive material is incorporated herein by reference.

While the drawings illustrate the case in which the transverse pipe is at a right angle to the axis of the third clamp, it will be clear that by proper design and positioning of the inserts in the second clamp, the pipe held in the second clamp can have its axis at any selected angle to the axis of the second clamp, as desired. Although the simplest situation, as regards inserts and faces for the heater means involves right angle positioning, this invention is applicable to pipe joints other than right angle joints.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims including the full range of equivalency to which each element or step thereof is entitled.

What is claimed:

1. Pipe fusion apparatus for joining plastic pipe either coaxially in-line or at a selected angle to each other, comprising:
   (a) frame means having a longitudinal axis;
   (b) first pipe clamp means with its axis parallel to said longitudinal axis, said clamp fastened to said frame near a first end thereof;
   (c) second pipe clamp means fixed near a second end of said frame for rigidly holding one pipe so that its axis is at a selected angle to and in a plane passing through the axis of said first clamp;
   (d) third movable pipe clamp means slidably mounted on said frame between said first and second clamps thereof, said third clamp to retain another pipe at all times coaxial with said first clamp;
   (e) means to longitudinally traverse said third clamp relative to said first clamp to provide said coaxial in-line pipe joints, and relative to said second pipe clamp to provide said angle type joints; and
   (f) means positionable co-axial to said third clamp to heat the opposed pipe surfaces.

2. The pipe fusion apparatus as in claim 1 in which said means to traverse said third clamp comprises manual lever and linkage.

3. The pipe fusion apparatus as in claim 1 in which said means to traverse said third clamp comprises hydraulic means.

4. The pipe fusion apparatus as in claim 1 in which said frame means comprises a rectangular base frame and two upright posts at the corners of said second end.

5. The pipe fusion apparatus as in claim 4 in which said second clamp means comprises V-shaped inserts in each of said posts and chain means to clamp a pipe into said inserts.

6. The pipe fusion apparatus as in claim 5 in which said inserts are designed to clamp a pipe therein at a right angle to the axis of said third clamp.

7. The pipe fusion apparatus as in claim 5 in which said inserts are designed to clamp a pipe therein at a selected angle other than 90° to the axis of said third clamp.

8. The pipe fusion apparatus as in claim 4 in which said means to slidably mount said third clamp comprises a plurality of spaced apart support rods, said rods fastened at their first ends, to said first clamp and at their second ends to said upright posts.

9. The pipe fusion apparatus as in claim 8 in which the plane of the axes of said support rods lies in a plane through the axis of said first and third clamp means.

10. The pipe fusion apparatus as in claim 1 in which said first pipe clamp means comprises:
    a lower clamp portion mounted on said frame, and having a circular recess in its upper edge;
    an upper clamp portion in the plane of said lower clamp portion and hingedly mounted thereto, and having a circular recess in its lower edge;
    circular insert means removably held in said circular recesses; and
    means to force said upper clamp portion toward said lower clamp portion.

11. Pipe fusion apparatus for joining thermoplastic pipe either coaxially, in-line, or at a right angle to each other, comprising:
    (a) frame means having a longitudinal axis;
    (b) first pipe clamp means with its axis substantially parallel to said longitudinal axis, said first clamp fastened to said frame near a first end thereof;
    (c) second pipe clamp means fixed to the second end of said frame for rigidly holding one pipe at a right angle to, and in the plane of the axis of said first clamp;
    (d) two spaced apart parallel support rods supported at their first ends on said first clamp means and at their second ends on said second clamp means;
    (e) third movable pipe clamp means slidably supported on said support rods between said first and second clamp means, the axis of said third clamp at all times coaxial with said first clamp;
    (f) means to longitudinally traverse said third clamp on said support rods; and
    (g) means positionable co-axial to said third clamp to heat the opposed pipe surfaces.

12. The pipe fusion apparatus as in claim 11 in which the plane through the axes of said support rods passes through the axis of said first and third clamp means.

References Cited

UNITED STATES PATENTS

| | | | |
|---|---|---|---|
| 3,616,024 | 10/1971 | Windle | 156—293 |
| 3,050,810 | 8/1962 | Lindbloom | 156—258 |
| 3,015,143 | 1/1962 | Lindbloom | 156—258 |
| 3,253,972 | 5/1966 | Huddleston | 156—304 |
| 3,013,925 | 12/1961 | Larsen | 156—499 |
| 3,552,265 | 1/1971 | Lucas | 156—258 |

CHARLES E. VAN HORN, Primary Examiner

C. WESTON, Assistant Examiner

U.S. Cl. X.R.

156—293, 304